UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

ELECTRICAL RESISTANCE.

1,039,463.  Specification of Letters Patent.  Patented Sept. 24, 1912.

No Drawing.  Application filed September 18, 1909.  Serial No. 518,378.

*To all whom it may concern:*

Be it known that I, ELIHU THOMSON, a citizen of the United States, residing at Swampscott, county of Essex, State of Massachusetts, have invented certain new and useful Improvements in Electrical Resistances, of which the following is a specification.

This invention relates to electrical resistance and has for its object the provision of a device of this character which will have a high specific resistance and which at the same time will be practically indestructible and easily produced.

My invention relates more specifically to the production of molded or stick resistances.

It has heretofore been proposed to employ the element silicon in the construction of resistances. Silicon, when used in the pure, or commercially pure condition, especially where it is cast in rods, is quite brittle. This characteristic makes it unsuitable for many purposes, since it will not stand the shocks and jars to which it naturally would be subjected and the percentage of breakage in shipping would be very high. Moreover the specific resistance of pure silicon is not sufficiently high for many purposes.

In carrying out my invention I employ the element silicon mixed with inert materials. It has been found that silicon, when heated considerably above its melting point, wets and permeates masses, such as masses of sand, clay or ground quartz, loosely packed, with facility, giving a dark gray mass. This mass is quite tough and is of higher resistance than silicon itself. The mixture may be molded into rods or bars of any desired shape. Mechanically the substance is not brittle and can be ground on a carborundum wheel. The material can be formed by mixing sand or silica with powdered or granular silicon and heating the mixture by passing an electric current through it or by externally heating, and a mold of fused silica may be employed for heating the material. Any desired method of heating and molding the material may, however, be employed, the feature of my invention being the formation of a concrete product composed of silicon and an inert material.

Various modifications of my invention will suggest themselves to those skilled in the art without departing from the spirit of my invention, since it is understood that I do not limit the invention to the particular materials employed, nor the method of forming the same into resistance units except in so far as it is limited by the scope of the claims annexed hereto.

What I claim as new and desire to secure by Letters Patent of the United States, is:—

1. A resistance comprising a mass of inert material impregnated with fused silicon.
2. A resistance unit comprising a porous mass of inert material permeated with fused silicon.
3. A strong, tough resistance material, having an electrical resistance higher than silicon, comprising a concrete of inert material and a binder of silicon.
4. A strong, tough resistance material, having an electrical resistance higher than silicon, comprising silicon and a substantial admixture of silicious material.
5. The process of making a resistance material which consists in making an intimate mixture of silicon and an inert material while the silicon is heated considerably above its melting point and shaping said mixture into desired form.

In witness whereof, I have hereunto set my hand this sixteenth day of September, 1909.

ELIHU THOMSON.

Witnesses:
JOHN A. McMANUS, Jr.,
CHARLES A. BARNARD.